US009344188B2

(12) United States Patent
Vall-Llosera et al.

(10) Patent No.: US 9,344,188 B2
(45) Date of Patent: May 17, 2016

(54) DEVICE, REMOTE NODE AND METHODS FOR PON SUPERVISION

(75) Inventors: Gemma Vall-Llosera, Jarfalla (SE); Patryk Urban, Vallingby (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 16 days.

(21) Appl. No.: 14/130,316

(22) PCT Filed: Jul. 1, 2011

(86) PCT No.: PCT/SE2011/050897
§ 371 (c)(1),
(2), (4) Date: Dec. 30, 2013

(87) PCT Pub. No.: WO2013/006100
PCT Pub. Date: Jan. 10, 2013

(65) Prior Publication Data
US 2014/0133847 A1     May 15, 2014

(51) Int. Cl.
*H04B 10/071* (2013.01)
*H04L 12/44* (2006.01)
*G01M 11/00* (2006.01)
*H04J 14/02* (2006.01)

(52) U.S. Cl.
CPC ......... *H04B 10/071* (2013.01); *G01M 11/3127* (2013.01); *G01M 11/3136* (2013.01); *H04J 14/0247* (2013.01); *H04J 14/0252* (2013.01); *H04J 14/0282* (2013.01); *H04L 12/44* (2013.01); *H04J 14/0227* (2013.01); *H04J 14/0246* (2013.01); *H04J 14/0272* (2013.01)

(58) Field of Classification Search
CPC ....................................................... H04B 10/08
See application file for complete search history.

(56) References Cited

U.S. PATENT DOCUMENTS

| 5,285,305 A | * | 2/1994 | Cohen et al. | 398/31 |
| 5,321,541 A | * | 6/1994 | Cohen | 398/82 |
| 5,440,416 A | * | 8/1995 | Cohen et al. | 398/82 |

(Continued)

FOREIGN PATENT DOCUMENTS

| CN | 101917226 | * 12/2010 | H04B 10/08 |
| JP | 2011-024095 | * 2/2011 | H04B 10/08 |

(Continued)

OTHER PUBLICATIONS

Hilbk et al.: "Selective OTDR measurements at the central office of individual fiber links in a PON", Tech. digest Optical Fiber Communication Conf., Dallas (Texas), 1997, paper TuK3.*

(Continued)

*Primary Examiner* — Li Liu
(74) *Attorney, Agent, or Firm* — Nicholson De Vos Webster & Elliott LLP

(57) ABSTRACT

A wavelength shifter module and a method therein for tuning an OTDR signal to at least one pre-selected wavelength in a passive optical network (PON). The wavelength of the OTDR signal is shifted to a pre-selected wavelength to enable a remote node in the optical distribution network ODN of the PON to forward the OTDR signal to a specific drop section in the ODN. The invention also includes a remote node and a method in a remote node for receiving a wavelength shifted OTDR signal having a preselected wavelength and outputting the wavelength shifted OTDR signal to a specific drop section. Furthermore, the invention involves a method for determining the location of a fault section in a drop section.

8 Claims, 10 Drawing Sheets

(56) References Cited

U.S. PATENT DOCUMENTS

| | | | | |
|---|---|---|---|---|
| 5,452,124 | A * | 9/1995 | Baker | 359/341.2 |
| 5,491,573 | A * | 2/1996 | Shipley | 398/13 |
| 6,396,573 | B1 * | 5/2002 | Pimpinella | 356/73.1 |
| 7,259,906 | B1 * | 8/2007 | Islam | 359/334 |
| 2005/0271321 | A1 * | 12/2005 | Shimizu et al. | 385/24 |
| 2006/0164628 | A1 * | 7/2006 | Kuo | 356/73.1 |
| 2006/0238746 | A1 * | 10/2006 | Rosolem et al. | 356/73.1 |
| 2008/0291431 | A1 | 11/2008 | Wang et al. | |
| 2009/0080880 | A1 * | 3/2009 | Lee et al. | 398/14 |
| 2010/0316372 | A1 * | 12/2010 | Chang et al. | 398/12 |
| 2012/0263458 | A1 * | 10/2012 | Wen et al. | 398/28 |
| 2013/0148109 | A1 * | 6/2013 | Bei et al. | 356/73.1 |
| 2013/0148958 | A1 * | 6/2013 | Liang et al. | 398/13 |
| 2013/0259469 | A1 * | 10/2013 | Smith et al. | 398/16 |

FOREIGN PATENT DOCUMENTS

| | | |
|---|---|---|
| JP | 2011024095 | 2/2011 |
| WO | WO 2012/087205 | 6/2012 |
| WO | WO 2013/002692 | 3/2013 |

OTHER PUBLICATIONS

Urban, et al., "OTM- and OTDR-based cost-efficient Fiber Fault Identification and Localization in Passive Optical Network," Optical Fiber Communication Conference, Technical Digest. OFC/NFOEC (Mar. 6, 2011). 3 pgs.

Yuksel, et al., "Optical Layer Monitoring in Passive Optical Networks (PONs): A review," Transparent Optical Networks, ICTON 2008. 10th Anniversary Int'l Conference on (Jun. 22, 2008) p. 92-98, 7 pgs. IEEE, Piscataway, NJ, USA.

PCT International Search Report for PCT Counterpart Application No. PCT/SE2011/050897, (Mar. 29, 2012), 5 pages.

PCT Written Opinion of the International Searching Authority for PCT Counterpart Application No. PCT/SE2011/050897, (Mar. 29, 2012), 6 pages.

Extended European Search Report, EP Application No. 11868870.4, dated Mar. 20, 2015, 6 pages.

Smith, R. B., "*Optical Handling Capacity of Low Loss Optical Fibers As Determined by Stimulated Raman and Brillouin Scattering*," Applied Optics; vol. 11; No. 11; Nov. 1972; 6pgs.

Kotanigawa, T. et al., *Applicable Wavelength Range of U-Band Signals in In-Line Raman amplifier WDM Systems*, Electronic Letters; vol. 39; No. 13; Jun. 26, 2003; 2pgs.

ITU-T, G.984.2; "Gigabit-capable Passive Optical Networks (GPON): Physical Media Dependent (PMD) layer specification," (Mar. 2003); 38pgs.

ITU-T; G.987.1; "10-Gigabit-capable passive optical networks" (XG-PON): General Requirements; Series G: Transmission Systems and Media, Digital Systems and Networks; Jan. 2010; 52pgs.

* cited by examiner

DEVICE, REMOTE NODE AND METHODS FOR PON SUPERVISION

CROSS-REFERENCE TO RELATED APPLICATIONS

This application is a National stage of International Application No. PCT/SE2011/050897, filed Jul. 1, 2011, which is hereby incorporated by reference.

FIELD OF THE INVENTION

The present invention relates to optical layer monitoring in a passive optical network (PON).

BACKGROUND OF THE INVENTION

A passive optical network (PON) is a network architecture employing fiber cables from a central office to local premises. It employs passive optical components to enable a single optical feeder fiber to serve multiple premises. A PON consists of a central office node, where the optical line terminal (OLT) equipment is located, one or more termination nodes at customer premises, called optical network terminations (ONT) or optical network units (ONU), and), and the infrastructure such as fiber, splitters, filters, etc. connecting the central office node to the termination nodes, called the optical distribution network (ODN). In a passive optical network a single optical fiber, feeder fiber, guides the light towards the remote node (RN) where it is delivered to the different drop sections by means of data splitters, arrayed waveguide gratings (AWGs), filters, or any other passive equipment. From the RN the light is guided towards the customer premises: ONT if the unit serves one single home, ONU if the unit serves multiple homes. On the uplink, the ONT/ONU sends user data back to the OLT using the same or a different wavelength.

The primary reason for the PON choice has been its cost effectiveness because of the efficient use of the fiber and because of that most equipment outside the central office can be passive equipment that does not consume power. Compared to active optical networks (AON) PON can lower both operational expenditure (OPEX) and capital expenditure (CAPEX). Different forms of PON including Broadband PON (BPON), Ethernet PON (EPON), Gigabit Ethernet PON (GEPON), and Gigabit PON (GPON) have been deployed in different markets. Even though PONs have relatively low OPEX compared to active solutions, there is still room for the operators to save significant amount of OPEX using effective preventive maintenance of the physical infrastructure.

In today's PON systems, the physical infrastructure is usually not entirely visible to a network management system (NMS). A physical failure cannot be detected before creating service outage in upper layers which may lead to loss in business for the operators. The aim of preventive maintenance is to detect any kind of deterioration in the network that can cause suspended services and to localize these faults.

Supervision of monitoring of PONs should provide continuous, remote, automatic, and cost effective supervision of the physical layer. It should provide rapid and accurate detection of performance degradation as well as service disruption. The testing should not affect normal data transmission (non-intrusive testing). It should distinguish between a failure in the end-users' own equipment and a failure in the operator's network. It should be interoperable with many network variants (bit rate, protocol etc.).

A common maintenance tool employed for monitoring or supervision of PONs is an optical time domain reflectometer and the technique used is called optical time domain reflectometry (OTDR). The OTDR injects a series of optical pulses into the fiber under test. Backscattered (Rayleigh) and back-reflected (Fresnel) light from points along the fiber is detected and analyzed. The magnitude of the backscattered signal is dependent on the Rayleigh backscattering coefficient, attenuation, fiber imperfections and splices, and optical power level in the fiber. The strength of the return pulses is measured, integrated as a function of time, and evaluated as a function of fiber length. The OTDR may be used to estimate the fiber's length and overall attenuation, including splice and mated-connector losses. It may also be used to locate faults, such as breaks, and to measure optical return loss. The optical dynamic range of an OTDR is limited by a combination of optical pulse output power, optical pulse width, input sensitivity, and signal integration time. Higher optical pulse output power, and better input sensitivity, combine directly to improve measuring range, and are usually fixed features of a particular instrument.

OTDR monitoring technique is commonly used in PON systems. The same can be outlined for the Raman assisted OTDR, commonly planned to gain higher resolution in system fault detection. Off-the-shelf OTDR market equipment uses a fixed wavelength in the U-band of the ITU-T grid but for future access technologies as WDM PON, tunable OTDR devices would be required. Tunable OTDR enables selection of a specific drop section to be monitored without the need of an optical switch at the RN. However, many operators have already invested into OTDR equipment in the central office and are not interested in making further investments to upgrade the OTDR equipment.

Monitoring should not influence regular data communication, i.e. it should be non-invasive. This is achievable by utilization of a dedicated optical bandwidth for the measuring function. Further, the technique should be sensitive to relatively low power fluctuations detectable in on-demand or periodic modes. Still further, it should not require any high initial investment. This mainly yields that no additional monitoring functionality on the customer premises side should be needed and PON monitoring functionality should be shared over a complete PON system or a group of PON systems.

Today's existing solutions for providing supervision or monitoring do only satisfy some of the above requirements. An overview of some existing solutions is given in the article K. Yuksel, V. Moeyaert, M. Wuilpart, and P. Mégret "Optical Layer Monitoring in Passive Optical Networks (PONs): A Review", ICTON 2008, Tu.B1.1. Most of the solutions existing today significantly increase capital expenditures because they require either a customized OTDR device, which is expensive, wavelength specific components in the fiber links (drop section) towards the ONTs, which causes power budget reduction, advanced OLT transmitter upgrades, e.g. light path doubling. Still further, most of today's existing solutions to provide supervision or monitoring can only detect a fault in a fiber link which introduces significant loss of more than 5 dB, far above an expected threshold of 1 dB.

SUMMARY OF THE INVENTION

It is an object of the present invention to address at least some of the problems outlined above. In particular, it is an object of the exemplifying embodiments to provide a wavelength shifter module and a method therein for adapting an optical time domain reflectometry, OTDR, signal for supervision of drop sections in a passive optical network, PON, wherein the wavelength of the OTDR signal is shifted to a pre-selected wavelength to enable a data splitter in a remote node to forward the OTDR signal to an individual drop section in the PON, thereby supervising the fiber links in the drop section between the remote node and the ONT.

It is also an object of the present invention to provide a network node and a method therein for receiving a wavelength shifted OTDR signal from the wavelength shifter module for outputting to a dedicated drop section. Furthermore, it is an object of the invention to provide a system for determining the location of at least one fault section in a drop section of a passive optical network (PON) and a method for supervising individual drop sections in the PON.

These objects and others may be obtained by providing a wavelength shifter module and a method in a wavelength shifter module; a remote node and a method in a remote node; and a system for determining a location of a fault section in a drop section of the PON and method in a PON according to the independent claims attached below.

According to an aspect of the invention, a wavelength shifter module configured to wavelength shift an OTDR signal for supervision of individual drop sections in a PON is provided. The wavelength adaption module is configured to receive an OTDR signal comprising at least one wavelength, to filter the received OTDR signal, and to shift the wavelength of the filtered OTDR signal to a pre-selected wavelength, preferably in a Raman wavelength shifter. The module is further configured to filter the wavelength shifted signal in a tunable filter to output a wavelength shifted optical signal having the pre-selected wavelength towards a remote node in the network. The wavelength of the optical signal has been preselected to enable a data splitter in the remote node to forward the wavelength shifted OTDR signal to a drop section or a group of drop sections in the PON, thereby enabling supervision of the fiber links in the drop sections.

According to another aspect of the invention, a method in a wavelength shifter module is provided for adapting an OTDR signal for supervision of a drop section in a PON. The method comprises receiving an OTDR signal having at least one wavelength, filtering the signal in a filter arranged to discriminate optical signals within at least one pre-selected wavelength interval. The method further comprises inputting the filtered signal to a wavelength shifter, wherein the wavelength of the OTDR signal is shifted to a pre-selected wavelength. Filtering the wavelength shifted signal in a tunable filter tuned to allow passage of optical signals of pre-selected wavelengths and inputting the signal from the tunable filter to a circulator arranged to output the wavelength shifted signal to a remote node. The wavelength of the optical signal has been pre-selected to enable a data splitter in the remote node to forward the wavelength shifted signal to one or a group of drop sections in a PON.

According to yet an aspect of the invention a remote node is provided for a passive optical network, wherein the node comprises a first filter arrangement and at least one sequential splitter arrangement. The remote node is adapted to receive a wavelength shifted OTDR signal, to filter the wavelength shifted signal and to output a selected wavelength of the wavelength shifted signal to a drop section in a group of optical network terminals.

In accordance with a further aspect of the invention, a method in a remote node is provided for distributing a wavelength shifted OTDR-signal to at least one drop section in a passive optical network (PON), including the steps of receiving a wavelength shifted OTDR-signal having a pre-selected wavelength and outputting the wavelength shifted signal to at least one dedicated drop section.

According to another aspect of the invention, a system for determining a location of at least one fault section in a drop section in a passive optical network (PON) is provided. The system comprises an OTDR equipment in a central office node of the system, and at least one remote node comprising a data splitter arrangement. A wavelength shifter module is arranged at the output of the OTDR equipment, the wavelength shifter module being arranged to shift the wavelength of a received OTDR signal to a pre-selected wavelength and to circulate the wavelength shifted signal to a remote node in the passive optical network.

According to a further aspect of the invention, a method in a passive optical network (PON) is provided for determining the location of at least one fault section in a drop section from a remote node to an optical network termination (ONT) or an optical network unit (ONU). The method comprises receiving a fault indication in a network management plant in the optical line terminal in a central office from at least a transceiver in an optical network termination (ONT) or optical network unit (ONU). The method further includes initiating fault detection by transmitting an optical time domain reflectometry (OTDR) signal of at least one wavelength in the downlink. Shifting the wavelength of said optical OTDR signal to a predetermined wavelength, forwarding the wavelength shifted signal to a remote node and distributing the wavelength shifted signal to at least one drop section corresponding to the received fault indication.

A significant advantage of the inventive wavelength shifter module, the method in the wavelength shifter module, the remote node and the method in the passive optical network is the ability to monitor individual drop sections with high accuracy and fault detection sensitivity limited only by the performance of the applied OTDR. This means that there is usually a high sensitivity to detect low power fluctuations.

Another advantage is that the solution offers a possibility of configuring the network node without components requiring power supply. Specifically, the remote node can be configured as a passive node incorporating passive filters and power splitters. Furthermore, the solution is an all optical solution providing the benefit of not having to perform optical/electrical/optical conversions.

Furthermore, the inventive solution offers the advantage of being cost effective since the required additional hardware components are few and on the shelf components. The solution does not require additional monitoring functionality on the optical network termination side, i.e., all added functionality may be included in the central office.

Yet another advantage is that the OTDR monitoring is non invasive and does not influence the regular data communication.

The solution is applicable to any known type of passive optical network, including WDM PONs.

DETAILED DESCRIPTION OF THE INVENTION

Figure 1A:
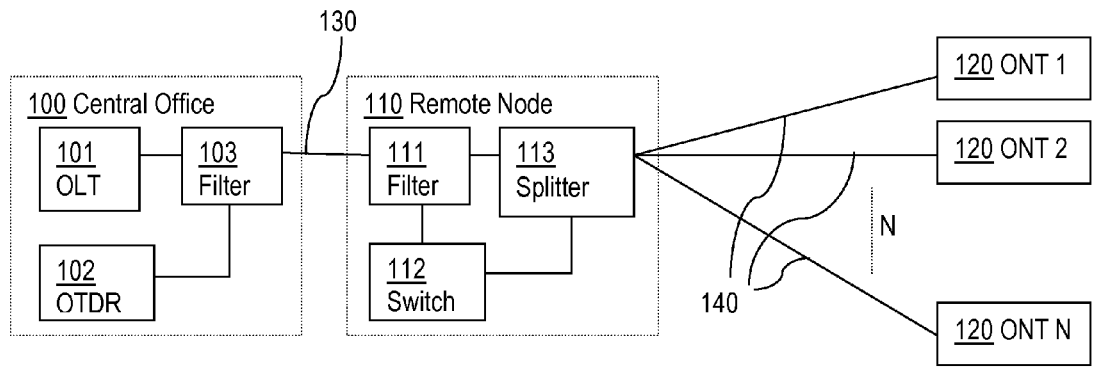
FIG. 1 Prior Art PON configuration
a. Common OTDR feeder
b. Dedicated OTDR feeder
FIG. 2 Wavelength shifter module
a. Basic configuration
b. Further embodiment
c. Further embodiment
FIG. 3 PON configuration
a. Common OTDR feeder, N ONT branches
b. Dedicated OTDR feeder, N ONT branches
c. Common OTDR feeder, N remote nodes FIG. 4 Block diagram illustrating splitter arrangements according to PON network configurations in FIG. 3
 a. Splitter arrangement, common feeder, K=1, N=4
 b. Splitter arrangement, dedicated feeder, K=1, N=4
 c. Splitter arrangement, common feeder, K=1, N=8
 d. Splitter arrangement, dedicated feeder, K=1, N=8
Figure 1B:
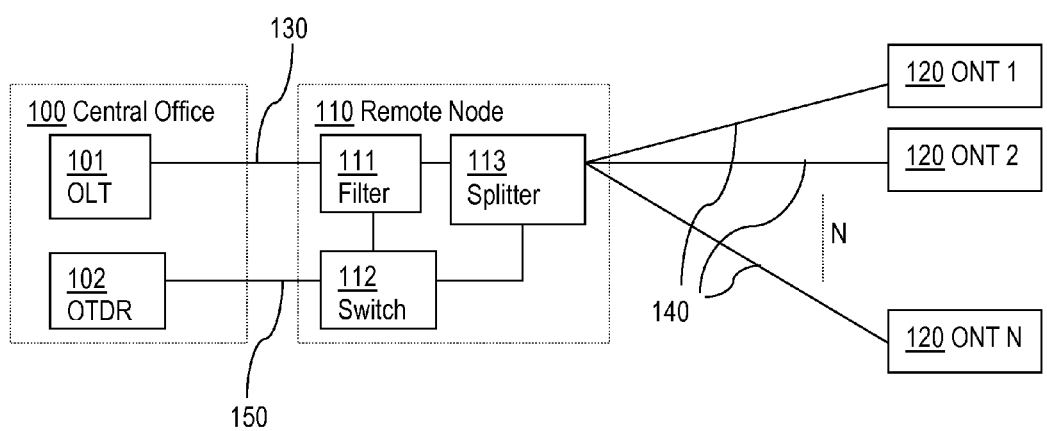

FIG. 1 discloses a block diagram of an exemplifying embodiment of a prior art passive optical network (PON). The PON comprises a central office (CO) 100 having an optical line termination (OLT) 101 and an OTDR device 102. The central office 100 exchanges information with optical network terminations (ONT) 120 through an intermediate remote node (RN) 110 including at least one splitter arrangement 113. The central office 100 is connected to the RN by a feeder link 130. The ONTs 120 are connected to the RN 110 via fiber links 140, which are also referred to as drop sections. In the embodiment illustrated in FIG. 1a a common fiber 130 connects the OLT 101 and the OTDR device 102 to the remote node 110. A filter or switch on the connection side to the remote node, offers the ability to direct the relevant signals to the remote node. An alternative configuration is presented in FIG. 1b, wherein a dedicated feeder fiber 150 connects the OTDR device to the remote node 110. In order to achieve the ability to direct the OTDR signal to different drop sections 140 from the remote node to the ONTs, a switch 112 requiring power supply is included in the remote node 110, thus converting the passive optical infrastructure into an active structure requiring power supply in the remote node 110.

Figure 3A:
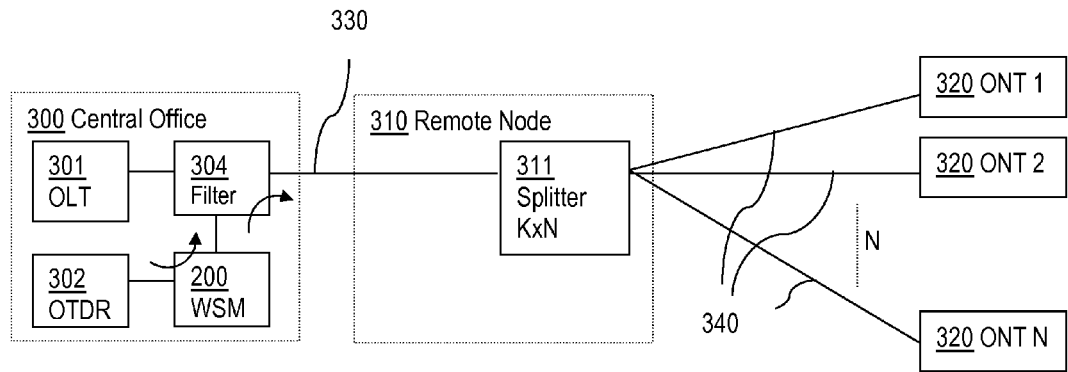
Figure 3B:
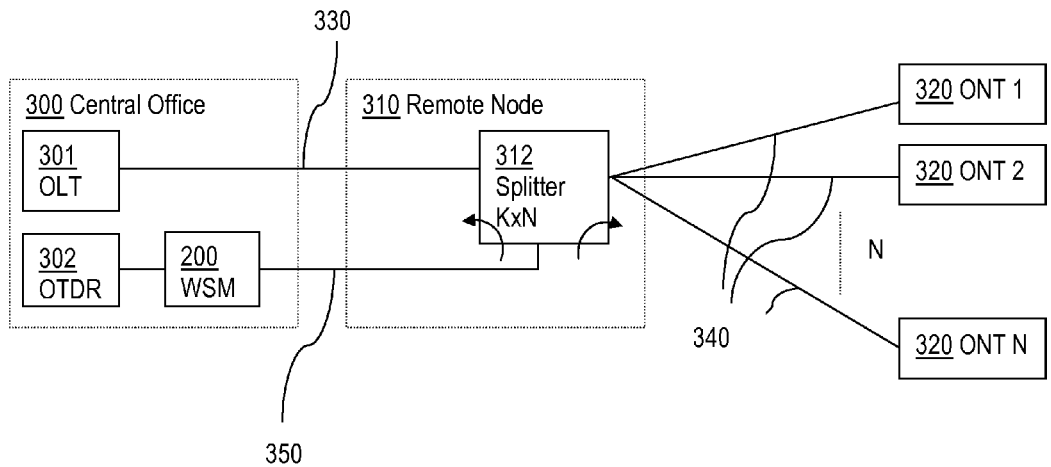
Figure 3C:
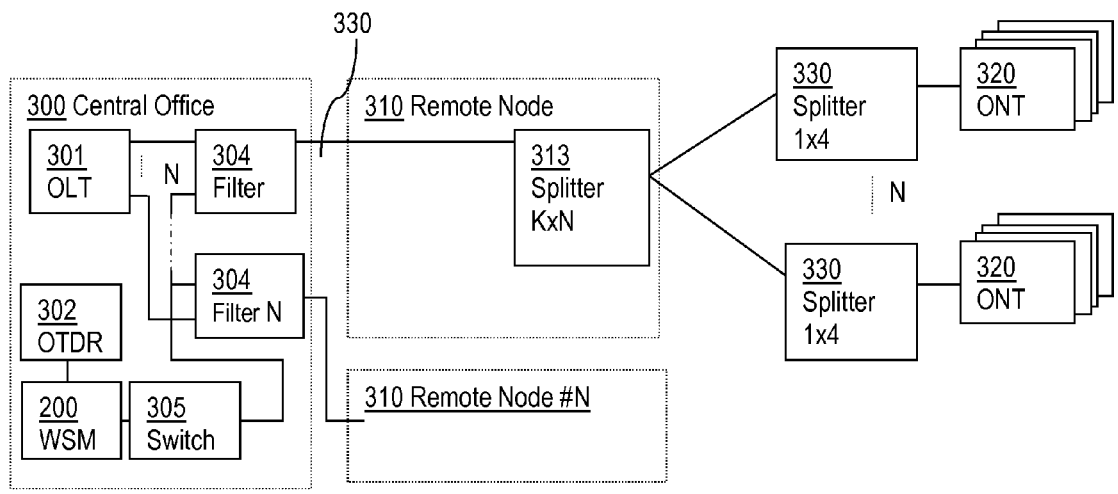

FIG. 3a-c discloses block diagrams of exemplifying embodiments of passive optical networks including the inventive wavelength shifter module 200. The wavelength shifter module 200 is included in the central office 300 on an outgoing side of the OTDR device 302. The wavelength shifter module 200 is arranged to receive a signal from the OTDR device 302 and to perform a wavelength shifting operation on the OTDR signal prior to outputting a wavelength shifted signal to a remote node 310. With the wavelength shifter module 200 introduced in the central office 300, it is possible to achieve the benefits of a tunable OTDR without having to replace OTDR devices 302 already in place in present networks. The wavelength shifter module 200 tunes the outgoing OTDR signal to a preselected wavelength within a range of tunable wavelengths within a Raman gain bandwidth. The selection of wavelength depends on information from drop sections 340 in the PON, wherein transceivers in ONT:s 320 are configured to signal malfunction. The OTDR device 302 is activated when information is received from an ONT transceiver that there is a malfunction in the corresponding drop section 340.

A network management plant in the optical terminal device in the central office 300 receives a malfunction indication from a transceiver at the downlink of a drop section 340. The optical line terminal 301 decides one drop section or a group of drop sections for OTDR monitoring and initiates the OTDR signaling in the OTDR device 302. The OTDR device 302 launches a short pulse of light into the fiber. The back-scattered light is monitored as a function of time or distance along the fiber. The OTDR pulse from the central office 300 is directed to the remote node 310 via a common feeder fiber 330 (FIG. 3a) or by means of a dedicated fiber 350 (FIG. 3b).

If more than one PON tree is to be monitored, the central office 300 is configured to include a switch 305 (FIG. 3c).

FIG. 4a-d discloses different configurations of the arrangements in the remote node 310. The inventive embodiments are discussed based on splitter arrangements 311, but it should be noted that arrangements wherein the splitters are substituted by wavelength de-multiplexers are foreseen within the scope of the invention. Arrangements with wavelength de-multiplexers are particularly useful for passive optical networks working according to wavelength division multiplexing (WDM) access technology.

Figure 4A:
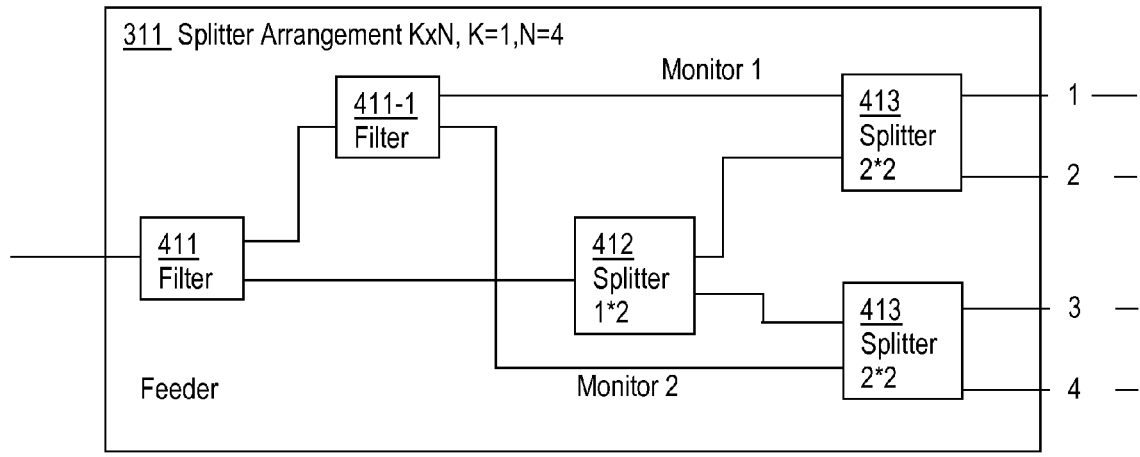
Figure 4B:
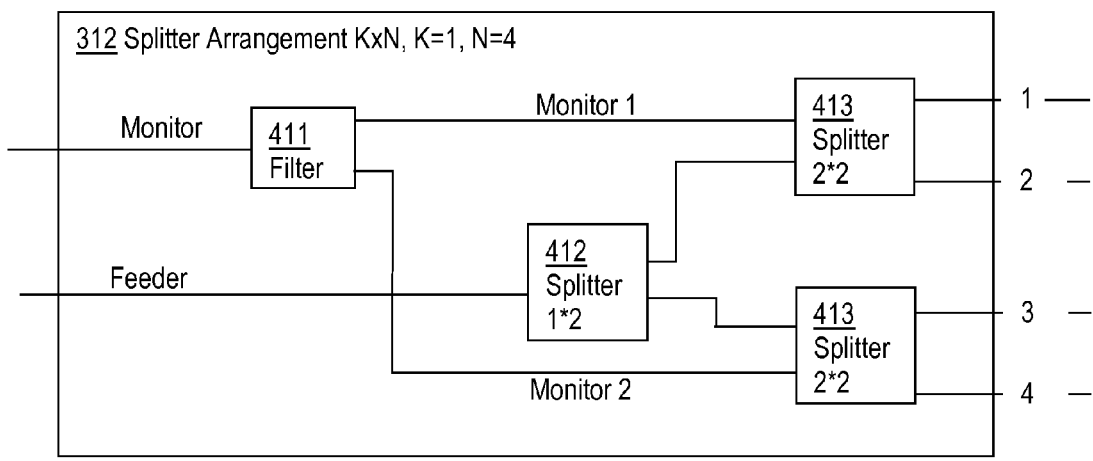
Figure 4C:
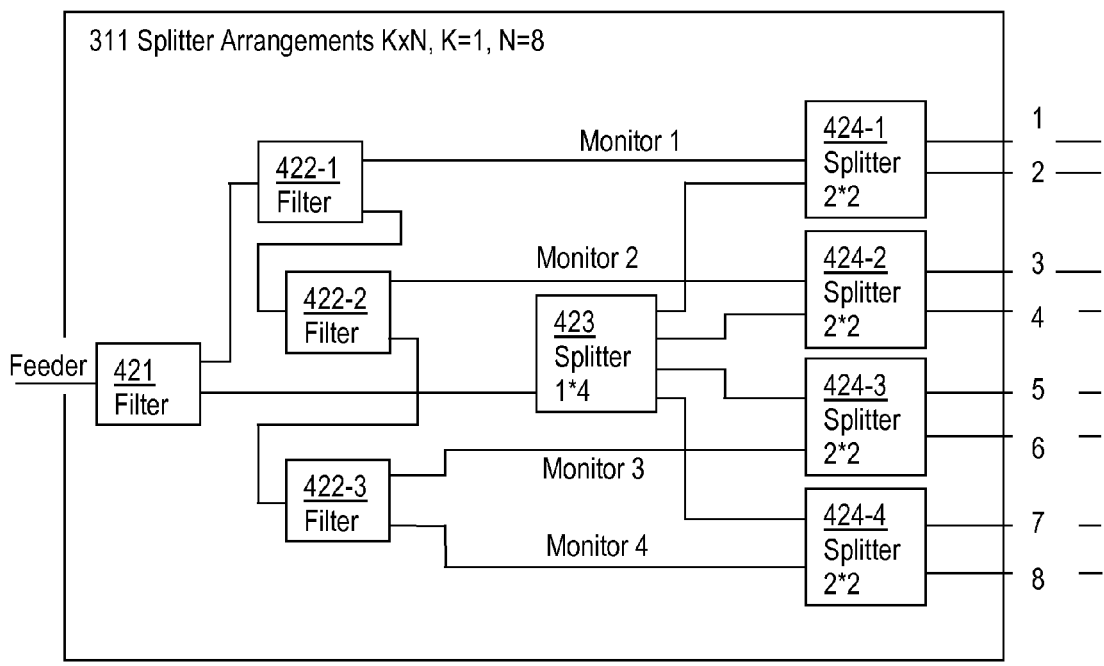

FIG. 4b is a block diagram illustrating an exemplifying splitter arrangement in a remote node in accordance with the passive network configuration of FIG. 3b, wherein K=1 and N=4. The splitter arrangement 312 comprises a first 1×2 splitter stage 412 having an input connected to the data communication feeder fiber. The two outputs from the 1×2 splitter are each connected to an input of a respective second 2×2 splitter. The second input of the respective second 2×2 splitter is connected to an output of a filter 411 which is arranged to receive the OTDR signal having a pre-selected wavelength on a dedicated fiber link. The filter is configured to forward the OTDR signal having the pre-selected wavelength to the splitter 2×2 if the pre-selected wavelength has a second value, illustrated by "Monitor 2". The two 2×2 splitters 413 constitute the last splitter stage in the disclosed embodiment. For the person skilled in the art, it is obvious that corresponding splitter arrangements are possible for splitter configurations of a higher order of K and N.

Figure 4D:
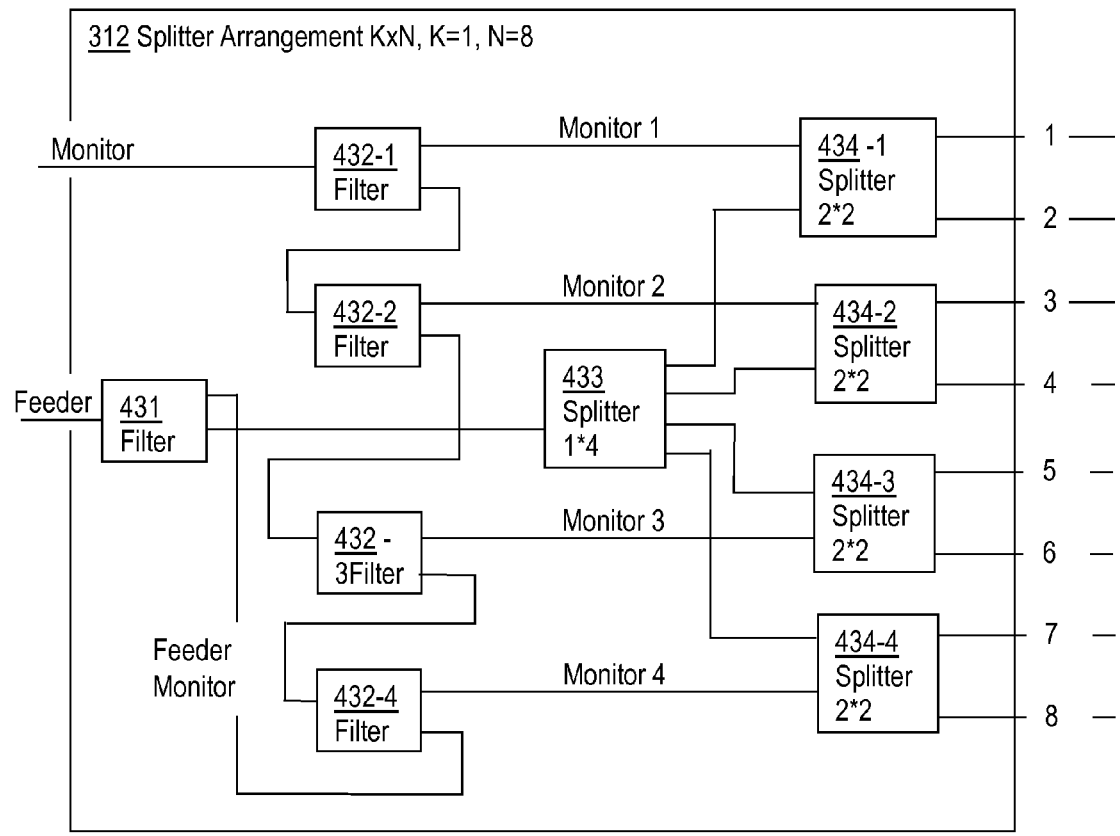

However, in order to clearly illustrate the scalability of the splitter arrangements, FIG. 4d discloses a splitter arrangement 312 wherein K=1 and N=8. A data communication feeder is connected to a filter, which is configured to forward a received data information signal from the OLT to a 1×4 splitter in a first splitter stage. The dedicated fiber link for the OTDR signal, here illustrated as "Monitor", is connected to a first filter configured to forward the OTDR signal having a pre-selected wavelength to a first 2×2 splitter in case the pre-selected wavelength has a first value. This is illustrated by "Monitor 1". The first 2×2 splitter 434 may be connected to a to first group 2 ONTs, but may also be connected to a further splitter arrangement. If the pre-selected wavelength does not correspond to the first value, then the first filter 432-1 is configured to forward the OTDR signal having the pre-selected wavelength to a second filter 432-2. The second filter forwards the OTDR signal to a second 2×2 splitter in case the pre-selected wavelength has a second value, illustrated by "Monitor 2". It the preselected wavelength does not correspond to the second value, the second filter is configured to forward the OTDR signal having a pre-selected wavelength to a third filter 432-3. Corresponding steps are applied in the third and fourth filters. The four 2×2 splitters constitute a secondary splitter stage in the disclosed embodiment.

It will be clear to the person skilled in the art that the embodiments illustrated in FIG. 4a-4d are non-limiting to the invention and that it is possible to scale the splitter stage to handle as many drop section branches as output wavelengths as the number of pre-selected wavelengths from the wavelength shifter module. The significance in the configuration of the remote node lies in the lack of active components required in the remote node for distribution of the pre-selected OTDR wavelength to the correct drop section; thus the remote node may be configured without power supply.

Figure 2A:
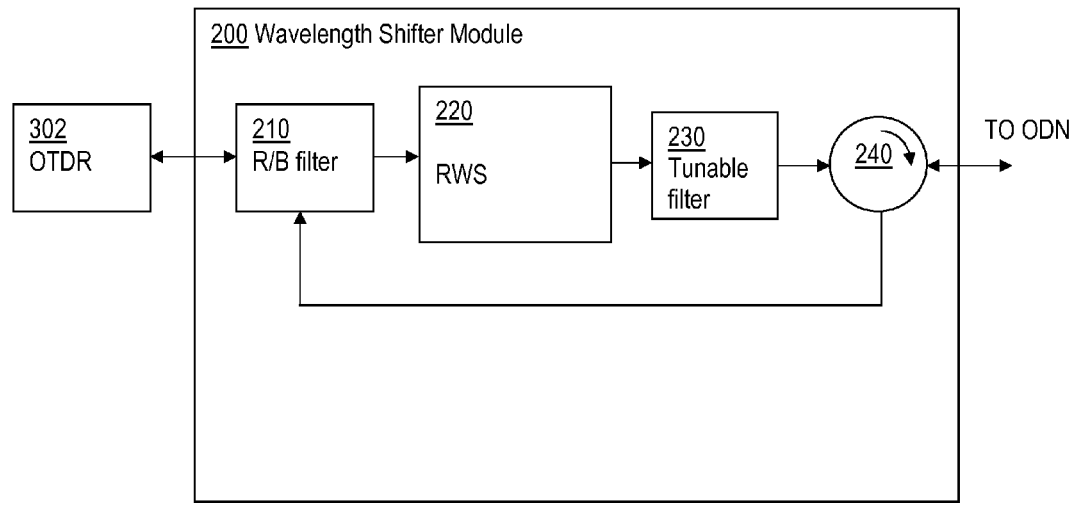
Figure 2B:
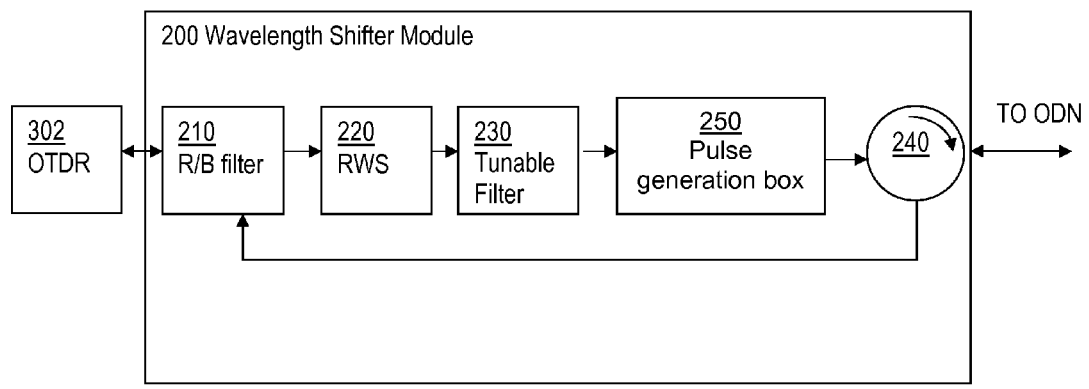
Figure 2C:
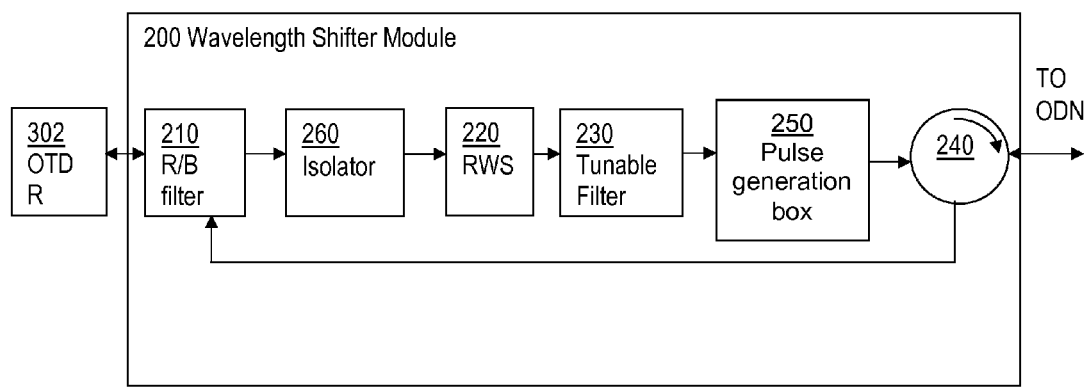

FIG. 2a-2c illustrates different embodiments of the inventive wavelength shifter module 200, wherein FIG. 2a depicts a basic configuration of such a wavelength shifter module.

An OTDR signal is received in an incoming wavelength discriminating filter 210 of the wavelength shifter module 200. This filter 210 is preferably a red/blue (R/B) filter, but other types of wavelength discriminating filters are also foreseen within the scope of the invention and the illustrated embodiment. The filtered signal having a wavelength within a predetermined wavelength interval is introduced into a wavelength shifter 220, preferably a Raman wavelength shifter (RWS). In the wavelength shifter light the wavelength of the incoming light is tuned to a selected range of wavelengths. The parameters of the RWS may be set so that it is possible to obtain several wavelengths at the output of the Raman wavelength shifter depending on the reflectivity value of the fiber Bragg grating. Based on stimulated Raman scattering and using the fact that when the Stokes power becomes large enough it can act as a pump to the next order Stokes, it is possible to greatly expand the range of wavelengths possible to use for monitoring of different drop sections in the network.

The tunable filter 230 following the Raman wavelength shifter 220 enables selection of an appropriate generated Stokes wavelength for monitoring of a specific drop section. Tuning of this filter 230 is enabled through control signals from the network management system. A circulator 240 on the output of the wavelength shifter module 200 is configured such that the wavelength shifted OTDR signal having the pre-selected wavelength fed to the circulator will be transmitted towards the remote node. The circulator will also allow received back-scattered light resulting from the wavelength shifted OTDR signal to be transmitted towards the wavelength discriminating filter 210 on the up-link side of the RWS. The filter will allow passage of the back-scattered light through the filter and towards the OTDR device 302 so that evaluation of the back-scattered signal is enabled.

FIG. 2b discloses a configuration of the wavelength shifter module 200, wherein a pulse generation arrangement 250 is introduced following the tunable filter. The pulse generation arrangement 250 enables reshaping of the optical carrier from the RWS in the case that the generated Stokes wavelengths do not follow the main carrier envelope. An example of implementation of the pulse generation box involves saturating the light (constant output power) and then amplitude modulating the signal.

FIG. 2c discloses an embodiment of a wavelength shifter module 200 including an isolator 260 on the output of the incoming wavelength discriminating filter 210. The isolator 260 prevents light-leakage from the RWS in the backward direction.

Due to the fiber loops in the Raman wavelength shifter and the Bragg cavities, a time delay will be imposed on the outgoing signal. This may be corrected with post-processing techniques in the central office 300.

It should be noted that FIG. 2a-2c illustrates various functional units in a wavelength shifter module 200 that may be implemented using any suitable software and/or hardware means/circuits. The inventive wavelength shifter module 200 is not limited to the disclosed embodiments.

Figure 5:
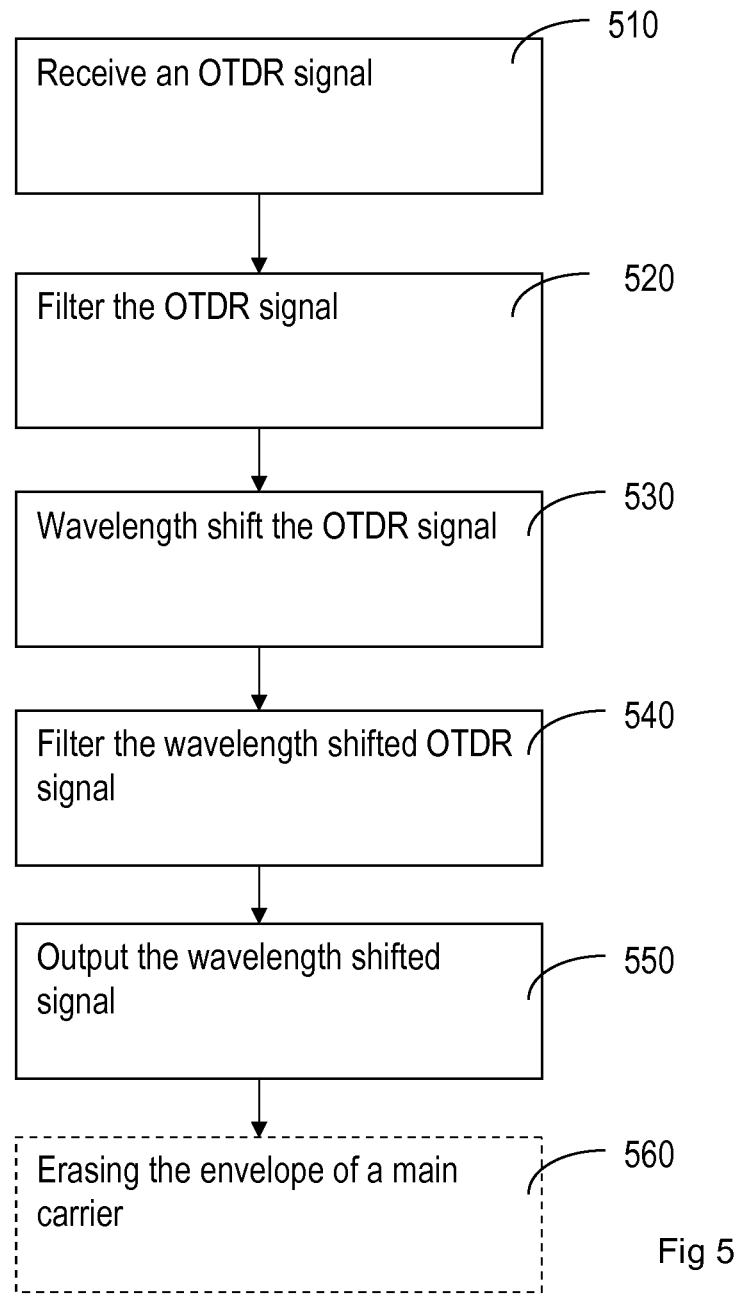
FIG. 5 Flowchart illustrating an exemplifying embodiment of a method in a wavelength shifter module FIG. 6 Flowchart illustrating an exemplifying embodiment of a supervision method in a PON.

FIG. 5 discloses the inventive method in a wavelength shifter module 200 wherein the wavelength shifter module 200 in a first step 510 receives an OTDR signal from an OTDR device 302, preferably arranged in the central office 300 of the PON. The OTDR signal is a short pulse of light with at least one wavelength launched into the fiber optical signal. In the discussed embodiment, the OTDR signal is of a predetermined, fixed wavelength. However, the invention need not be limited to fixed wavelength OTDR signals but could also be applicable to any type of situation where a wavelength outside the available range of wavelengths is required.

The method further involves filtering of the received OTDR signal in a wavelength discriminating filter, preferably a Red/Blue (R/B) filter, in a second step 520. The filtered signal is subjected to wavelength shifting 530, wherein the wavelength shifting may be achieved through stimulated Raman scattering and use of the fact that when the Stokes power becomes large enough it can act as a pump to the next order Stokes. The output Stokes wavelengths will depend on the Stokes shift in the wavelength shifter and the characteristics of the fiber Bragg grating. In order to obtain several wavelengths following the wavelength shifting, part of the signal from the wavelength shifter will be subjected to feedback or amplification and part of the signal will be further processed in subsequent method steps. Such subsequent method steps involve filtering of the Stokes wavelengths to allow passage of a pre-selected wavelength in a fourth step 540. The wavelength is pre-selected to enable a data splitter in a remote node to forward the wavelength shifted signal to a dedicated group of ONTs in the PON. A concluding step 550 in the method in the wavelength shifter module 200 involves outputting the wavelength shifted signal of a pre-selected wavelength.

In another embodiment of the invention, the method in the wavelength shifter module 200 also involves the step 560 of erasing the envelope of a main carrier in the filtered wavelength shifted Stokes wavelengths and to remodulate the light signals to conform to OTDR pulse signaling.

Figure 6:
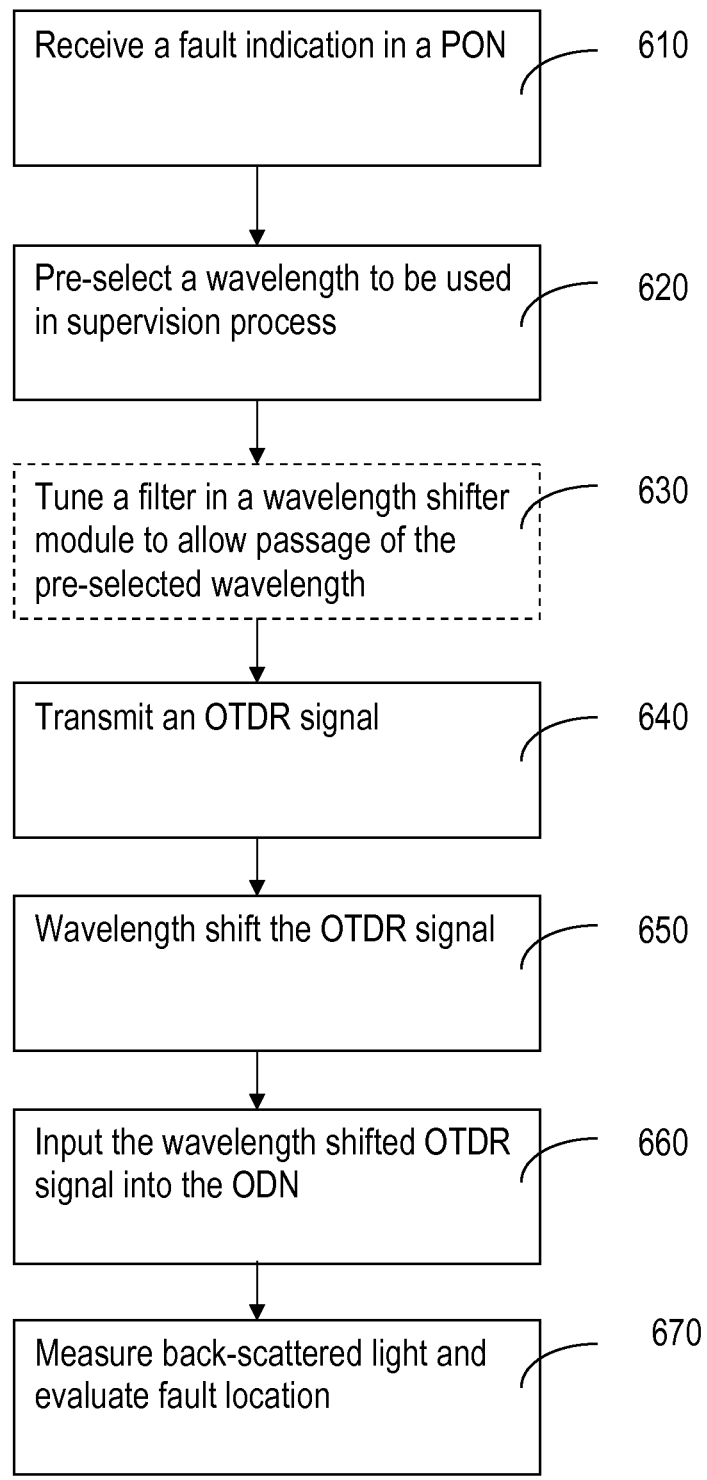

FIG. 6 discloses the inventive method for determining the location of at least one fault section in a drop section from a remote node to an optical network termination (ONT) or an optical network unit (ONU). A network management plant in the central office 300 receives a fault indication from a drop section in the optical distribution network in a initial step 610. The fault indication may be based on transceiver signaling form the transceiver in the ONT or ONU, but the inventive method is not limited to the method of assessing the existence of mal-functioning drop section. Based on the drop-section to be evaluated, a tunable filter in the wavelength shifter module 200 may be adjusted in a following step 630 to allow passage of the pre-selected wavelength signal. OTDR signaling into the optical distribution network is initiated so that an OTDR signal is transmitted in a following step 640. The OTDR signal is wavelength shifted in a subsequent step 650 to the pre-selected wavelength prior to injection into the optical distribution network. The wavelength shifted signal is distributed to the relevant drop section, preferably by filtering and power splitting of the wavelength shifted signal. However, in a WDM-PON embodiment, the power splitting is substituted by wavelength de-multiplexing. The distance to the fault section in the drop section is determined from the back-reflected light from the drop section.

FIG. 6 discloses a method in a passive optical network for determining a location of an existing fault section in a drop section. However, the inventive method may also be used for supervising different drop sections without the prior knowledge of the existence of a fault. In such an instance the pre-selection of the wavelengths from the wavelength shifter will involve possible OTDR wavelengths corresponding to the number of drop sections to supervise. By directing OTDR signals of specific wavelengths to specific drop sections, the existence and location of a fault in a drop section may be established without prior fault indications.

While the invention has been exemplified by means of the embodiments given above, the invention is not limited to these specific embodiments but include any alternatives, modifications and varieties that would fall within the wording of the attached claims.

The invention claimed is:

1. A wavelength shifter module in a passive optical network (PON) configured to adapt an optical time domain reflectometry (OTDR) signal from an OTDR device for supervision of a drop section in the PON, the wavelength shifter module arranged in a fiber path between the OTDR device and a remote node (RN) and comprising:
   a first wavelength filter arranged to allow passage of light within a predetermined wavelength interval;
   a Raman wavelength shifter arranged to tune wavelengths of the filtered light to a range of wavelengths, wherein the range of wavelengths is selected based on information from one or more drop sections in the PON;
   a tunable filter tuned to allow passage of a pre-selected wavelength from the range of wavelengths from the Raman wavelength shifters, for monitoring of a specific drop section; and
   a pulse generation arrangement to erase an envelope of a main carrier of the pre-selected wavelength and remodulate light according to OTDR pulses; and
   a circulator to distribute the tuned light to a port in an optical distribution network (ODN) for monitoring the specific drop section.

2. The wavelength shifter module according to claim 1, wherein the Raman wavelength shifter is included in a dedicated fiber feeder for the OTDR signal to the remote node in the PON.

3. The wavelength shifter module according to claim 1, wherein the Raman wavelength shifter is arranged in the fiber path of a common feeder fiber for the OTDR signal and an information carrying light signal to the remote node in the PON.

4. The wavelength shifter module according to claim 1, wherein the first wavelength filter is a red/blue filter (R/B filter).

5. The wavelength shifter module according to claim 4, wherein an isolator is arranged downlink from the R/B filter to prevent leakage from backscattered light in the Raman wavelength shifter.

6. A method in a wavelength shifter module for supervision of an optical distribution network (ODN) in a passive optical network (PON), the method comprising:
   receiving an optical time domain reflectometry (OTDR) signal comprising at least one wavelength;
   filtering the received OTDR signal through a wavelength filter;
   shifting the at least one wavelength of the filtered OTDR signal by Stokes shifting to a range of wavelengths, wherein the range of wavelengths is selected based on information from one or more drop sections in the PON;
   filtering the wavelength shifted signal to allow passage of a wavelength shifted signal of a pre-selected wavelength through a tunable filter, wherein an envelope of a main carrier of the wavelength shifted signal of the pre-selected wavelength is erased and the filtered light is remodulated in conformity with OTDR pulse signaling; and
   outputting the wavelength shifted signal on a feeder fiber to the ODN for monitoring a specific drop section.

7. The method according to claim 6, wherein the filtering of the received OTDR signal is a red/blue filtering.

8. A system for determining a location of at least one fault section in a drop section in a passive optical network (PON), comprising:
   an optical time domain reflectometry (OTDR) equipment in a central office node of the system;
   at least one remote node comprising a data splitter arrangement; and
   a wavelength shifter module at an output of the OTDR equipment, wherein the wavelength shifter module comprises:
      a first wavelength filter arranged to allow passage of light within a predetermined wavelength interval;
      a Raman wavelength shifter arranged to tune wavelengths of the filtered light to a range of wavelengths, wherein the range of wavelengths is selected based on information from one or more drop sections in the PON;
      a tunable filter tuned to allow passage of the filtered light of a pre-selected wavelength from the selected range of wavelengths from the Raman wavelength shifter, for monitoring of a specific drop section; and
      a pulse generation arrangement to erase an envelope of a main carrier of the pre-selected wavelength and remodulate light according to OTDR pulses; and
      a circulator to distribute the tuned light to the at least one remote node in the PON for monitoring the specific drop section.

* * * * *